United States Patent [19]

Tatsuno et al.

[11] Patent Number: 4,564,268
[45] Date of Patent: Jan. 14, 1986

[54] OPTICAL SYSTEM FOR SEMICONDUCTOR LASER

[75] Inventors: Kimio Tatsuno, Kokubunji; Akira Arimoto, Musashimurayama, both of Japan

[73] Assignee: Hitachi Ltd., Tokyo, Japan

[21] Appl. No.: 381,915

[22] Filed: May 24, 1982

[30] Foreign Application Priority Data

May 29, 1981 [JP] Japan .................................. 56-81053

[51] Int. Cl.⁴ ............................................. G02B 3/04
[52] U.S. Cl. .................................. 350/409; 350/432; 372/101
[58] Field of Search ............... 350/433, 409, 432, 434, 350/435; 372/101

[56] References Cited

U.S. PATENT DOCUMENTS

| | | | |
|---|---|---|---|
| 4,253,735 | 3/1981 | Kawamura et al. | 350/433 X |
| 4,318,594 | 3/1982 | Hanada | 350/433 |
| 4,425,655 | 1/1984 | Fisli | 372/101 |

FOREIGN PATENT DOCUMENTS

| | | |
|---|---|---|
| 2006461 | 5/1979 | United Kingdom . |
| 2049980 | 12/1980 | United Kingdom . |
| 2053553 | 2/1981 | United Kingdom . |

*Primary Examiner*—John K. Corbin
*Assistant Examiner*—Scott J. Sugarman
*Attorney, Agent, or Firm*—Antonelli, Terry & Wands

[57] ABSTRACT

An optical system for focusing a light beam emitted from a semiconductor laser is disclosed which comprises a lens of a numerical aperture NA satisfying a relation ( $$NA \leq \sqrt{\frac{\lambda}{\Delta Z}}$$

(where $\lambda$ and $\Delta Z$ indicate a laser wavelength of and an astigmatic focal distance in the semiconductor laser, respectively) to make the wave front aberration of a light beam emerging from the lens smaller than or equal to $\lambda/4$, thereby correcting astigmatism in the semiconductor laser.

20 Claims, 3 Drawing Figures

OPTICAL SYSTEM FOR SEMICONDUCTOR LASER

The present invention relates to an optical system for focusing a laser beam from a semiconductor laser to a diffraction limit.

In the case where a semiconductor laser is used as a light source for a laser beam printer (LBP), the light beam from the semiconductor laser is focused on a photosensitive drum with an optical system. When the semiconductor laser has astigmatism, the size of a light spot formed on the drum is larger than a value which is obtained for a semiconductor laser having no astigmatism and therefore corresponds to a diffraction limit. Accordingly, utilization factor of light energy is low, and moreover resolution is degraded. For LBP, it is required to form on the photosensitive drum a small light spot corresponding to the resolving power of human eyes, that is, it is required to focus the laser beam to a light spot having a diameter of less than 100 $\mu$m. However, such a small spot cannot be obtained due to astigmatism in the semiconductor laser, and moreover light energy is not concentrated into such a small spot, that is, utilization factor of light energy is reduced. Therefore, when a semiconductor laser having astigmatism is used as the light source of LBP, immoderate demands are made upon the sensitivity of the photosensitive drum and the light output of the semiconductor laser.

Further, when a semiconductor laser having astigmatism is used as a light source of an optical head for recording information in an optical disk or reproducing information from the disk, there arise various problems. That is, in the case of recording, a bit (or a small hole) which is the smallest recording unit, becomes larger in size than that determined by a diffraction limit, and therefore recording density, that is, the number of recording bits per disk is decreased. Further, since utilization factor of light is reduced, immoderate demands are made on the sensitivity of the recording medium on the optical disk and the light output of the semiconductor laser. In other words, a recording medium having higher sensitivity is required. Further, the semiconductor laser is forced to emit a high-intensity laser beam, which has an adverse effect on the life of the semiconductor laser.

Further, when a semiconductor laser is used as a light source for reproducing information from an optical disk, a light spot for reproduction is required to have a half-maximum width (namely, a full width of half maximum) of about 1 $\mu$m. However, in the case where the semiconductor laser has astigmatism, even if the light beam from the semiconductor laser is focused with an object lens of the same numerical aperture as in the case where a semiconductor laser having no astigmatism is used, the size of the light spot is larger than the required spot size. Thus, a signal reproduced from the optical disk is low in signal-to-noise ratio, and therefore reproduced picture image and sound are noisy.

A correction method employing a cylindrical lens has been known as one of methods of correcting astigmatism in a semiconductor laser (see, for example, Bell System Tech. Journal, Vol. 58, No. 9, 1979, page 1909). According to this method, however, the number of parts contained in an optical system is increased by the number of parts concerning the cylindrical lens, and moreover adjusted portions are increased. Accordingly, the method is disadvantageous in making compact and inexpensive a laser beam printer and an optical head for optical disk. Further, in the method, the tolerance in adjusting the position of the cylindrical lens for the light emitting part of the semiconductor laser is extremely small, and there is a fear of the cylindrical lens generating rather than correcting astigmatism. Furthermore, since the cylindrical lens does not have rotational symmetry with respect to an optical axis, it is required to adjust the cylindrical lens precisely in case it is disposed in the direction in which astigmatism in the semiconductor laser is generated. Further, it is hard to make the cylindrical lens with high working accuracy, and moreover the cylindrical lens is expensive. Thus, a ratio of the cost of the cylindrical lens to the whole cost of an optical head is large, and therefore the use of the cylindrical lens is disadvantageous.

An object of the present invention is to provide an optical system which can eliminate the above-mentioned drawbacks of the prior art, and which can correct astigmatism in a semiconductor laser to obtain a light spot focused to a diffraction limit.

In order to attain the above object, according to the present invention, an optical system for focusing a light beam from a semiconductor laser includes a lens of a numerical aperture NA satisfying the following relation:

$$NA \leq \sqrt{\frac{\lambda}{\Delta Z}}$$

where $\Delta Z$ and $\lambda$ indicate an astigmatic focal distance in and a laser wavelength of the semiconductor laser, respectively.

The present invention will be apparent from the following detailed description taken in conjunction with the accompanying drawings, in which.

First, explanation will be made on a semiconductor laser element used in the present invention.

Figure 1:
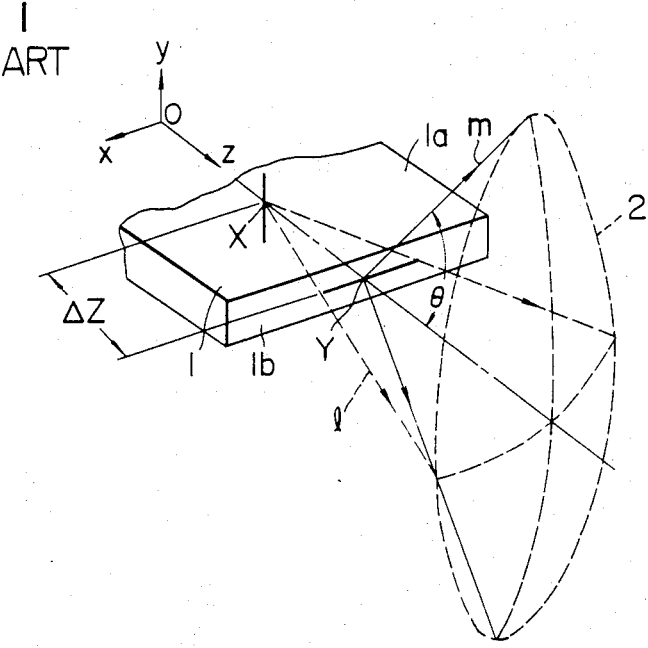
FIG. 1 is a schematic view for explaining astigmatism in a semiconductor laser.

A semiconductor laser has various advantages. For example, it is small in size and high in input-to-output conversion efficiency, and moreover can perform high-speed and direct modulation. However, owing to the structure of a resonator in a semiconductor laser, a beam waist position in a direction perpendicular to a junction plane and a beam waist position in a direction parallel to the junction plane are generally spaced apart from each other in the direction of optical axis. That is, the beam waist position in the direction perpendicular to the junction plane is placed on an end face of the resonator, and the beam waist position in the direction parallel to the junction plane is placed in an inner portion of the resonator spaced from the end face. Thus, astigmatism is generated in the semiconductor laser. FIG. 1 shows an example of a semiconductor laser having such astigmatism. In FIG. 1, reference numeral (or character) 1 designates a semiconductor laser emitting a light beam along an $O_Z$-axis of a 3-dimensional basic coordinate system $O_{xyz}$, X a beam waist position in the direction of the $O_x$-axis parallel to a junction plane 1a, and Y a beam waist position in the direction of an $O_y$-axis perpendicular to the junction plane 1a. A distance $\overline{XY}$ indicates an astigmatic focal distance $\Delta Z$. Further, in FIG. 1, a broken line l indicates a light ray having a velocity component in the direction of $O_x$-axis, a solid line m a light ray having a velocity component in the direction of $O_y$-axis, and an angle $\theta$ an angle of divergence of the light ray m.

A wave front (namely, a uniphase surface) 2 of light emitted from the semiconductor laser 1 having the astigmatic focal distance $\Delta Z$ has a certain distortion. When such a wave front is focused down to a small spot with a lens, astigmatism is also generated in the small spot. This brings about the previously-mentioned drawbacks. The astigmatic optical distance $\Delta Z$ in the semiconductor laser 1 is generated due to the fact that an optical guide in the direction parallel to the junction plane 1a is the so-called gain guide, and the fact that an effective refractive index at a position in the resonator is smaller as the position is more spaced apart from a center line in the direction of stripe width, as a result, a phase shift is generated between adjacent light rays, and thus the wave front in the resonator has a cylindrical form.

Figure 2:
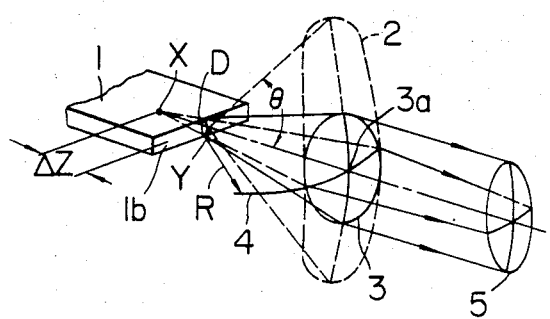
FIG. 2 is a schematic view for explaining a principle of the present invention.

In order to correct such astigmatism in the semiconductor laser, it is required that the correction method shown in the lens aberration theory is modified to be able to correct astigmatism in a light source itself. Referring to FIG. 2, a light beam emitted from a semiconductor laser 1 having an astigmatic focal distance $\Delta Z$ and a laser wavelength $\lambda$ impinges on an object lens 3 with an angle $\theta$ of divergence in intensity distribution. A wave front aberration (or a maximum wave front aberration) $\Delta\phi_o$ at the pupil plane of the object lens 3 is given by the following equation:

$$\Delta\phi_o = \tfrac{1}{4}\Delta Z \cdot \sin^2\theta \quad (1)$$

The wave front aberration $\Delta\phi_o$ is defined by a deviation of the actual wave front 2 from a reference sphere 4 which has its center at a position D of circle of least confusion in the semiconductor laser 1 having the astigmatic focal distance $\Delta Z$ (that is, a position spaced toward the inside from an end face 1b by a distance $\Delta Z/2$), and has a radius equal to a distance R between the position D and the center 3a of the pupil of the lens 3.

When the light beam having the wave front aberration $\Delta\phi_o$ is coupled with the object lens 3 of a numerical aperture NA, a wave front aberration $\Delta\phi$ at a wave front 5 of a light beam having passed through the lens 3 is given by the following equation:

$$\Delta\phi = \tfrac{1}{4}\Delta Z \cdot NA^2 \quad (2)$$

On the other hand, according to the Rayleigh criterion, a wave front having a wave front aberration $\Delta\phi$ can be focused down to a small spot corresponding to a diffraction limit, when the wave front aberration $\Delta\phi$ satisfies the following formula:

$$\Delta\phi \leq \lambda/4 \quad (3)$$

Accordingly, the following relations are obtained from the formulae (2) and (3):

$$\Delta\phi = \tfrac{1}{4}\Delta Z \cdot NA^2 \leq \tfrac{\lambda}{4} \quad (4)$$

-continued $$\therefore NA \leq \sqrt{\tfrac{\lambda}{\Delta Z}}$$

That is, in the case where a light beam emitted from the semiconductor laser 1 having the astigmatic focal distance $\Delta Z$ and the laser wavelength $\lambda$ is coupled with the object lens 3, if the numerical aperture NA of the lens 3 satisfies the formula (4), a light beam emerging from the lens 3 has a wave front aberration smaller than or equal to $\lambda/4$, and therefore can be focused down to a small spot corresponding to a diffraction limit. Needless to say, it is preferable to make the numerical aperture NA of the object lens 3 as large as possible in a range defined by the formula (4), since the utilization factor of light is increased.

Next, explanation will be made on the case where the present invention is applied to an optical head for optical disk. In recent years, it is intended to use, as a light source for optical disk, the so-called narrow stripe type semiconductor laser, which is an example of semiconductor lasers where an optical guide along stripe width is formed of only a gain guide. The narrow stripe type semiconductor laser is easy in crystal growth, as compared with refractive index guide type semiconductor lasers such as a channeled substrateplanar type semiconductor laser in which a groove is provided in a semiconductor substrate to form an optical guide along stripe width, and a buried hetero structure type semiconductor laser in which a crystal layer having a refractive index different from those of surrounding layers is buried as an active layer to form an optical guide along stripe width. Accordingly, the narrow stripe type semiconductor laser can be fabricated at very low a cost. Further, this semiconductor laser is extremely low in noise level produced when the laser beam returns to the resonator, as compared with the above-mentioned refractive index guide type semiconductor lasers. From these facts, the narrow stripe type semiconductor laser is considered to be advantageously used as a light source at an optical head for optical disk. However, since the narrow stripe type semiconductor laser does include a refractive index guide along stripe width, a large astigmatic focal distance $\Delta Z$ is generated in the semiconductor laser. That is, the value of $\Delta Z$ is about 20 $\mu m$ in ordinary cases, and is more than 40 $\mu m$ in special cases. The present invention is effective particularly in the case where a narrow stripe type semiconductor laser having such a large astigmatic focal distance $\Delta Z$ is used as a light source. For example, when a semiconductor laser having an astigmatic focal distance $\Delta Z$ of 20 $\mu m$ and a laser wavelength of 780 nm is used as a light source, a numerical aperture NA of an object lens for the semiconductor laser is determined by the following equation:

$$NA = \sqrt{\tfrac{0.78}{20}} = 0.1975$$

That is, it is required to use an object lens of a numerical aperture smaller than or equal to 0.1975.

When the astigmatic focal distance $\Delta Z$ in the semiconductor laser is equal to 40 $\mu m$, the numerical aperture NA of the object lens is determined by the following equation:

$$NA = \sqrt{\frac{0.78}{40}} = 0.1396$$

Figure 3:
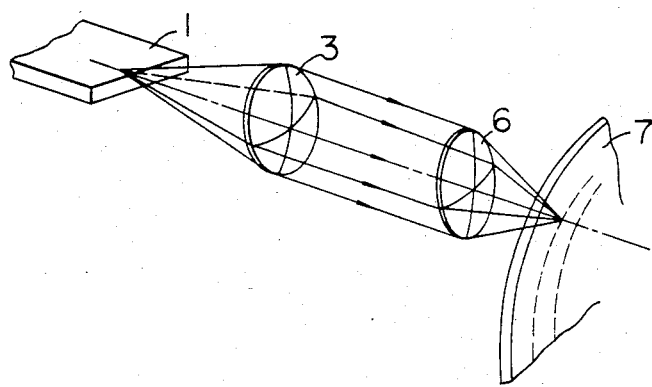
FIG. 3 is a schematic view for showing an optical arrangement in an embodiment of the present invention.

FIG. 3 shows an embodiment of the present invention in the case where a semiconductor laser having a large astigmatic focal distance is used as a light source at an optical head. Referring to FIG. 3, when a semiconductor laser 1 having an astigmatic focal distance of 20 μm is used, a wave front aberration of a laser beam emerging from an object lens 3 becomes smaller than or equal to λ/4 by making the numerical aperture of the lens 3 smaller than or equal to 0.1975. When such a laser beam is focused on a disk 7 with a focusing lens 6, a small spot is formed which is determined by a diffraction limit corresponding to a numerical aperture of the focusing lens 6. For example, when the focusing lens has a numerical aperture of about 0.5, a small spot having a diameter of the order of 1 μm is obtained. Thus, in a recording process, both the utilization factor of light and the resolution can be made optimum, and an optical disk of high recording density can be obtained. Further, in a reproducing process, a signal having a high signal-to-noise ratio is obtained, and a high-quality picture image or sound is reproduced.

As has been explained in the foregoing, according to the present invention, astigmatism in a semiconductor layer can be corrected by a simple optical system including an object lens of a selected numerical aperture. Thus, it becomes possible to form an optical disk of high recording density, to reproduce a signal having a high signal-to-noise ratio, and to fabricate a laser beam printer for obtaining high-quality printed letters.

What is claimed is:

1. An optical system for focusing a laser beam emitted from a gain guide type semiconductor laser on a predetermined recording medium which comprises a non-cylindrical lens satisfying a relatiion $$NA \leq \sqrt{\frac{\lambda}{\Delta Z}}$$

so as to correct astigmatism of said semiconductor laser, where NA, ΔZ and λ indicate a numerical aperture of said lens, an astigmatic focal distance in said semiconductor laser and a laser wavelength of said semiconductor laser, respectively.

2. An optical system according to claim 1, wherein said laser beam is emitted from said semiconductor laser having large astigmatism.

3. An optical system according to claim 1, wherein said non-cylindrical lens is a rotational symmetry lens.

4. An optical system for recording information on or reproducing information from an optical disc, said system comprising a gain guide type semiconductor laser having an astigmatic focal distance of ΔZ and adapted to emit light having a wavelength of λ, a lens system for focusing said light emitted by said laser on a recording medium in said optical disc, said lens system comprising a non-cylindrical lens having a numerical aperture NA which satisfies the relation $$NA \leq \sqrt{\frac{\lambda}{\Delta Z}}$$

so as to correct astigmatism in said semiconductor laser.

5. An optical system according to claim 4, wherein said gain guide type semiconductor laser is a narrow stripe type semiconductor laser.

6. An optical system according to claim 5, wherein the astigmatic focal distance is 20–40 μm.

7. An optical system according to claim 4, wherein said non-cylindrical lens enables a wave front aberration of the light emerging from said lens to be no greater than λ/4 so as to correct the astigmatism in said semiconductor laser.

8. An optical system according to claim 4, wherein said non-cylindrical lens is a rotational symmetry lens.

9. An optical system for focusing a laer beam emitted from gain guide type semiconductor laser to a diffraction limit on an optical disc, the semiconductor laser having as astigmatic focal distance of ΔZ and adapted to emit the laser beam having a wavelength of λ, said optical system comprising a non-cylindrical lens arranged to receive the laser beam emitted by the semiconductor laser, said lens having a numerical aperture NA which satisfies the relation $$NA \leq \sqrt{\frac{\lambda}{\Delta Z}}$$

so as to correct astigmatism in the semiconductor laser.

10. An optical system according to claim 9, further comprising a focusing lens for receiving the laser beam from said non-cylindrical lens and for focusing the laser beam from said non-cylindrical lens on a recording medium in the optical disc.

11. An optical system according to claim 9, wherein the gain guide type semiconductor laser is a narrow stripe type semiconductor laser.

12. An optical system according to claim 9, wherein said non-cylindrical lens enables a wave front aberration of the laser beam emerging from said lens to be no greater than λ/4, so as to correct astigmatism in the semiconductor laser.

13. An optical system according to claim 9, wherein said non-cylindrical lens is a rotational symmetry lens.

14. An optical disc apparatus for recording information on or reproducing information from an optical disc, said apparatus comprising a recording medium on and from which predetermined information is optically recorded or reproduced and which is provided in said optical disc, a gain guide type semiconductor laser having an astigmatic focal distance of ΔZ and adapted to emit a laser beam having a wavelength of λ, an optical system for focusing the laser beam emitted from said laser to a diffraction limit on said recording medium, said optical system comprising a non-cylindrical lens having a numerical aperture NA which satisfies the relation $$NA \leq \sqrt{\frac{\lambda}{\Delta Z}}$$

so as to correct astigmatism in said semiconductor laser.

15. An optical disc apparatus according to claim 14, wherein said non-cylindrical lens is a spherical lens arranged to receive the laser beam emitted by said semiconductor laser.

16. An optical disc apparatus according to claim 15, wherein said optical system further comprises a focusing lens for focusing the laser beam from said spherical lens on said recording medium.

17. An optical disc apparatus according to claim 15, said gain guide type semiconductor laser is a narrow stripe type semiconductor laser.

18. An optical disc apparatus according to claim 17, wherein the astigmatic focal distance is 20–40 μm.

19. An optical disc apparatus according to claim 14, wherein said non-cylindrical lens is arranged to receive the laser beam emitted by said semiconductor laser and for enabling a wave front aberration of a laser beam emerging from said non-cylindrical lens to be no greater than λ/4, so as to correct astigmatism in said semiconductor laser.

20. An optical system according to claim 14, wherein said non-cylindrical lens is a rotational symmetry lens.

* * * * *